Figure 1:
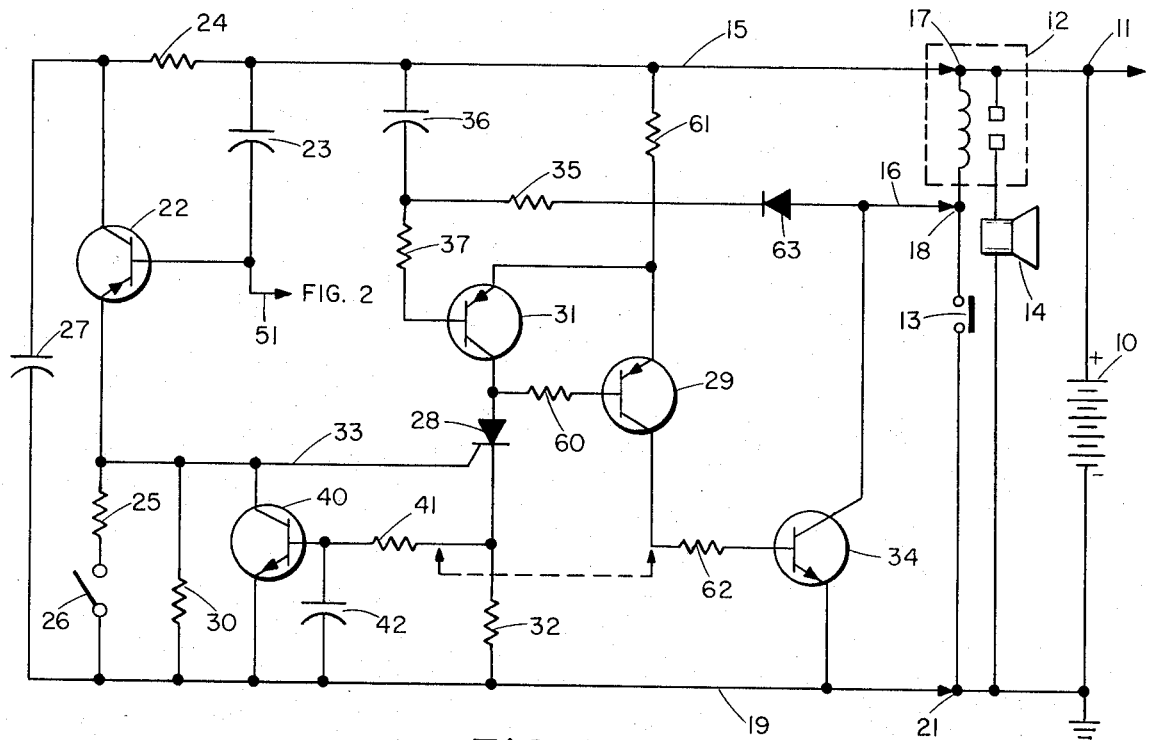

United States Patent [19]
Fischer

[11] 3,794,967
[45] Feb. 26, 1974

[54] INTRUDER ALARM FOR AUTOMOBILES

[76] Inventor: Laurence A. Fischer, 20 Arden Dr., Hartsdale, N.Y. 10530

[22] Filed: Aug. 3, 1972

[21] Appl. No.: 277,684

[52] U.S. Cl............ 340/63, 340/248 P, 340/253 P, 307/10 AT
[51] Int. Cl............................................. B60r 25/10
[58] Field of Search .. 340/63, 64, 65, 248 P, 253 P; 307/10 AT

[56] References Cited
UNITED STATES PATENTS
3,706,966   12/1972   So........................................ 340/63

Primary Examiner—Alvin H. Waring
Attorney, Agent, or Firm—Bruce L. Lamb

[57] ABSTRACT

An intruder alarm particularly suited for installation in an automobile. The alarm includes a transistor connected to the A-line of an automobile electrical system in an inverse manner, i.e., emitter-base reverse biased, to detect A-line transients. The sensor can be made sensitive to body contact by wiring to insulated portions of the automobile or to a pressure sensitive capacitor. A latching circuit, controlled by the sensor, actuates the automobile horn whenever the sensor detects an A-line transient or is otherwise disturbed by an intruder. Timing circuits modify the horn action so that an alarm signal is distinguishable from a fault in the horn circuit.

6 Claims, 2 Drawing Figures

INTRUDER ALARM FOR AUTOMOBILES

The present invention relates generally to theft alarms and in particular to an alarm well suited for installation in a vehicle by virtue of its size, ease of installation and several modes of tripping the same, none of which are easily defeated.

Numerous means of protecting an automobile against theft have been devised, one of the simplest of which is a circuit which energizes the vehicle horn whenever the engine ignition circuit is energized. This circuit includes a secretly located or combination operated switch to permit a lawful operator to defeat the alarm for normal operation of the automobile.

One disadvantage of this basic arrangement is that it affords no protection against unauthorized entry into the vehicle so that the owner is still unprotected against theft of batteries, tires and valuable accessories. To extend the protection of the basic alarm, improvements include the provision of additional sensing switches arranged to be tripped upon opening a door, hood or trunk or upon disturbance of an accessory of the car. While such an improved system is reliable, provided an adequate number of sensors is included, its artful installation so as to conceal the location of sensors and the connecting network of wires is complex and expensive.

One system which affords many of the protective features of the multiple contact sensor system, but which is much simpler to install, provides means for sensing transients on the automobile battery or A line whereby, when in the armed state, the alarm will be triggered by the activation of various of the car's electrical circuits, such as ignition, starter and lighting circuits.

It is an object of this invention to provide a theft alarm triggered by transients in the electrical supply of the protected device, most commonly an automobile, with improved means of great sensitivity for detecting such transients.

It is a further object to provide such an alarm system with protection extended to include sensitivity to unauthorized tampering or intrusion where such disturbances may not involve activation of any of the vehicle's electrical circuits by the intruder.

It is another object to provide an alarm system including control circuits whereby the alarm will be distinctly characterized so as to distinguish an alarm signal from a normal signal or signal resulting from a fault in the system. For example, a common and convenient source of alarm signals in an automobile is the horn. According to this invention, if the horn be blown as a result of a true alarm signal, the horn may be sounded as a tattoo, rather than as a continuous blast, which might be mistaken as resulting from a short circuit in the horn control.

Still another object is to provide an alarm system in which alarm signals are given only for a fixed period after triggering, following which the alarm shuts off and rearms itself to be immediately sensitive to subsequent disturbance.

These and other objects of the invention will become more clearly understood through study of the following complete description and accompanying drawings.

Briefly, the invention comprises the combination of a sensing circuit connected to detect A-line transients or changes in capacity or resistance occasioned by the presence of an intruder with a latching circuit controlling the alarm generator, for example, an automobile horn, together with time circuits altering the operation of the latching circuit to provide a distinctive intermittent alarm signal, shutdown and rearm for immediate use thereafter. The sensing circuit is constituted by an unconventionally connected transistor, i.e., with the emitter reverse biased and incorporating a triggering pulse energy source capacitor in the collector-emitter circuit, a high series collector resistance isolating the collector-base circuits and with a transient sensing capacitor in the base. Such a transistor is extremely sensitive to changes in the voltage source connected to the collector and emitter thereof and by virtue of the very high impedance of the connection it is further sensitive to changes in base capacity or resistance. When a small change occurs in either the voltage source, base resistance or base capacity, the sensing transistor supplies an amplified triggering impulse to an SCR constituting the latching circuit, thereafter timing circuits come into operation to determine the characteristic of the alarm signal.

Figure 2:
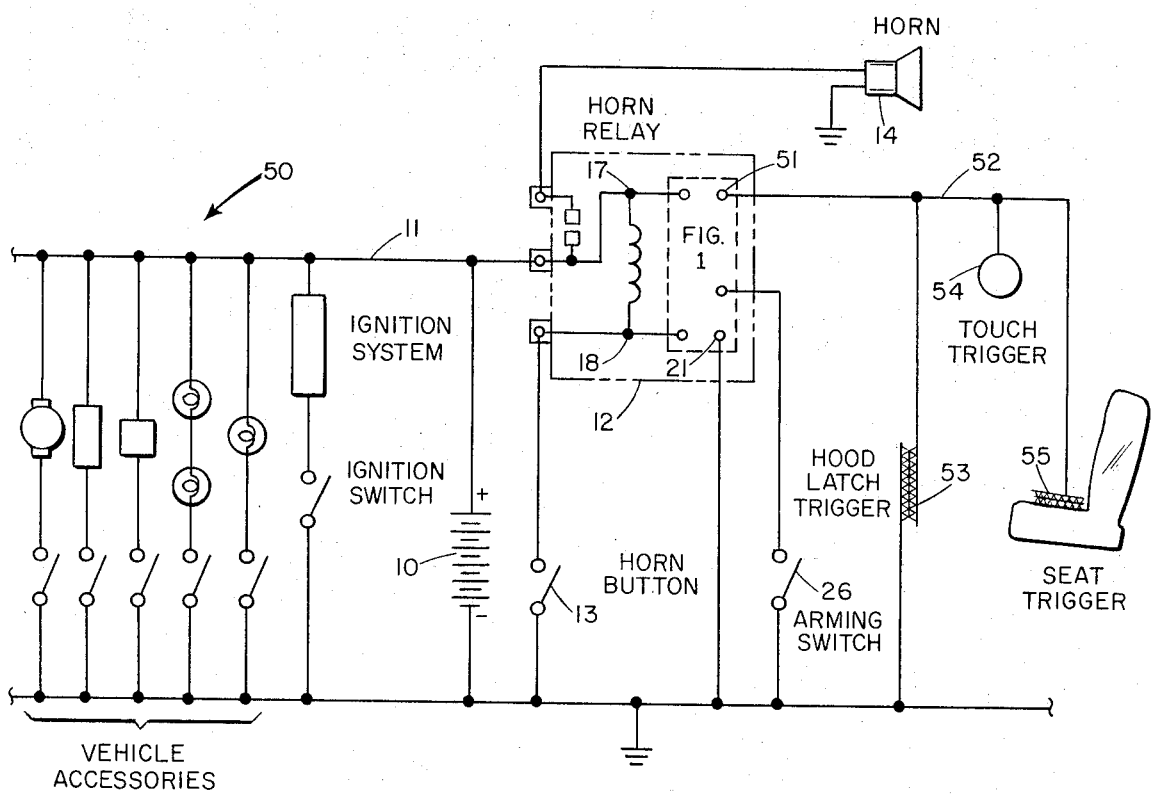

In the drawings:

FIG. 1 is a schematic diagram of the alarm circuit of the present invention; and FIG. 2 is a block diagram showing a typical vehicle installation including contact or touch sensing means or capacitance variation means for tripping the alarm in the presence of an intruder.

Referring to FIG. 1, the invention is shown as connected in an automobile having the usual negatively grounded storage battery 10 with the positive terminal thereof connected to the A-line 11 which supplies power to all electrical systems of the automobile. The conventional horn circuit includes a relay 12 and horn button 13, the closure of which energizes the relay, completing the circuit through and causing the automobile horn 14 to sound. The invention will be described only as installed in an automobile with a negative ground electrical system since the changes necessary to adapt it to positive ground systems will be obvious to those skilled in the art.

The alarm circuit is installed by connecting lines 15 and 16 to the existing relay terminals 17 and 18 and line 19 to the existing ground 21. The sensing transistor 22 is of the PNP type installed with emitter and collector inverted so that the emitter and collector are both biased in the reverse of conventional applications.

The base of transistor 22 is connected to line 15 through a low valued capacitor 23 (normally of the order of 100 to 1000 pf.); the collector is connected to line 15 through a high valued resistor 24 (normally of the order of 2 Megohms or higher); and the emitter is connected to the gate of the SCR 28 which in its inoperative state is connected to ground line 19 through an optional low value resistor 25 and arming switch 26. Switch 26 is open when the alarm is in an armed state. It is to be secretely but conveniently located to enable authorized operators of the automobile to disable the alarm. A storage capacitor 27 is connected between the collector of transistor 22 and ground line 19. The combination of very high resistance 24 with low capacitance 23 causes even a minute transient on A-line 11, communicated through line 15 to upset, momentarily, the reverse bias of transistor 22 and render it conductive long enough to dump a trigger pulse from capacitor 27 into the latching circuit next to be described.

The latching circuit comprises an SCR 28 (silicon controlled rectifier) with its anode connected multiply to positive line 15 through PNP type transistors 29 and 31, both of which are in the interrupter circuit and are normally non-conducting. A positive enabling potential is, however, passed through the emitter-base junction of transistor 29 to the anode of SCR 28. The cathode of SCR 28 is connected to ground line 19 through a resistor 32 and the gate thereof is connected by line 33 to the emitter of transistor 22. When transistor 22 discharges capacitor 27 a positive gate pulse is developed, causing SCR 28 to conduct. An optional resistor 30 may be used to prevent spurious triggering when sensing circuits, as hereinafter described, are incorporated.

Upon conduction of SCR 28 the base voltage of transistor 29 drops, rendering the latter fully conductive and causing a switching transistor 34, connected between line 16 and ground, to conduct and complete the circuit through the armature of horn relay 12, sounding the horn.

With line 16 effectively ground through transistor 34 the interrupter circuit comprising resistor 35 and capacitor 36 commences to charge and continues to do so until voltage applied to the base of transistor 31 through resistor 37 drops to a value forward biasing that transistor, causing it to conduct. When transistor 31 conducts, the base and emitter of transistor 29 are effectively shorted, cutting off conduction therethrough and through transistor 34, thereby interrupting the horn circuit. This interruption continues until capacitor 36 discharges through the parallel circuits of resistor 37, transistor 31, resistor 61 and resistor 35 and coil of relay 12. Upon discharge of capacitor 36, transistor 31 reverts to its non-conductive state and transistors 29 and 34 again conduct energizing the relay and horn as long as SCR 28 remains conductive. Capacitor 36 commences to recharge through resistor 35 shortly again reverse biasing transistor 31 and switching off transistors 29 and 34 and again interrupting the horn blast.

The frequency of interruption and "on" time of the cycle is determined by the time constant of RC network 35, 36 and values of resistors 37, 60, 61 and 62 all factors preferably being balanced so that the period of the cycle is from 0.1 to 6.0 seconds with a duty cycle ranging between 25 and 95 percent. A diode 63 may be inserted in line 16 if comparatively low values are selected for resistors 35 and 37. Since without the diode the discharge of capacitor 36 is effected through both resistors, the diode blocks current through resistor 35 extending the conduction time of transistor 31. The ratio of "on" time to "off" time, i.e., the duty cycle, of relay 17 may thus be reduced with a resultant decrease in power con-sumption. The intermittent blasting of the horn produced in this manner may continue indefinitely, but it is considered more desirable to terminate and reset the alarm after a period of one-half to four minutes. The portion of the circuit next described performs this function.

An NPN type transistor 40 is connected with its collector to line 33 and its emitter to ground line 19. Transistor 40 is normally non-conductive for lack of forward bias. The timing network comprising resistor 41 and capacitor 42 is connected across resistor 32 to charge after the desired period of operation of the alarm to a value forward biasing transistor 40 causing the same to conduct and effectively short circuit the gate and cathode of the SCR 28, thereupon causing cessation of conduction and arresting the operation of the alarm. The discharge of capacitor 42 and restoration of transistor 40 to non-conductive state is practically instantaneous and the alarm therefore is rearmed and ready for triggering upon the occurrence of a subsequent disturbance. If the disturbance is continuous, the small residual charge retained on capacitor 42 alters the timing cycle to approximately one-third that of the initial timing period.

Alternatively, resistor 41 may be connected to the collector of transistor 29, as shown by the dashed line. With this connection, capacitor 42 is charged only during the conductive periods of transistor 29, providing a longer period of alarm operation than would be obtained by charging capacitor 42 from the cathode of SCR 28. If the longer period is not desired, the alternative connection allows the value of capacitor 42 to be reduced, saving in the bulk of the circuit, while still maintaining the same operating period as in the former connection.

The alarm circuit just described may be constructed within a quite small volume enabling its attachment to a typical horn relay in the void space commonly present in the relay housing. The relay housing is preferably of metal to afford shielding the alarm circuit against electro-static or electromagnetic interference in installation other than metal bodied cars. The sensitivity of the alarm to contact or intrusion may be extended by installation in a vehicle as shown in FIG. 2.

Referring to FIG. 2, the automobile battery 10 is shown with a grounded negative pole and the positive pole connected to the A-line 11 from which the vehicle accessories 50 are supplied. Sensor transistor 22 may be triggered by a slight change in either the resistance or capacitance of the base circuit. A sensing wire 52 extends from base connection 51 of transistor 22 within the relay housing to a hood latch trigger 53, a touch trigger 54 and a seat capacitance trigger 55. Trigger 53 may be of a variable capacity type wherein a foil plate separated from the car body ground by a resilient dielectric material which, when compressed in an attempt to open the hood, will cause a variation in the transistor base capacity sufficient to trigger the alarm. Sensor 54 may be simply an exposed conductive plate insulated from the body of the automobile, which, when touched, causes a change in the very high leakage resistance from the base of transistor 22 to ground, triggering the alarm. Sensor 55 may be a conductive foil or cloth approximately 1 to 2 square feet placed under a seat cover, or if cloth, comprise part of a seat cover which is electrically connected to the base of transistor 22 and insulated from ground. The alarm is then triggered when capacitance to ground changes as a result of a person touching or sitting in the car seat.

Obviously, the number and particular location of additional sensors is a matter of choice and to provide maximum confusion to thieves, installations should vary from vehicle to vehicle. Other modifications are possible without departing from the precise teachings of the invention, the scope thereof being limited solely by the appended claims.

The invention claimed is:

1. In a theft alarm which includes means for detecting a sudden change in an electrical characteristic of a bipolar direct current circuit associated with the alarm for triggering the alarm into operation, improved detecting means comprising a transistor having an emitter electrode composed of one conductivity type of semiconductor material, a base electrode composed of the opposite conductivity type of semiconductor material and a collector electrode composed of said one conductivity type of semiconductor material, said emitter electrode being connected to the pole of said direct current circuit having a polarity opposite the conductivity type of semiconductor of which said emitter is composed, said collector electrode being connected to the other pole of said direct current circuit, said other pole being of the same polarity as the type of semiconductor of which said collector is composed, and means including a high impedance connecting said base electrode to said other pole of said direct current circuit to which said collector electrode is connected, a capacitor connected between said emitter and said collector electrodes of said transistor and a latching circuit having an input connected to said transistor to receive an impulse therefrom whenever the electrical equilibrium of said transistor is disturbed, said impulse rendering said latching circuit continuously conductive to operate said alarm.

2. The improvement claimed in claim 1 wherein said collector of said transistor is connected to said other pole of said direct current circuit through a high resistance and said high impedance connecting said base electrode comprises a capacitor.

3. The improvement claimed in claim 2 with additionally a conductor connected to said base of said transistor and insulated from said direct current circuit said conductor being so disposed as to be liable to be touched by a person unadvised of its existence, thereby disturbing the electrical equilibrium of said transistor and triggering said alarm.

4. The improvement of claim 1 wherein said direct current circuit is a battery powered electrical system for a vehicle.

5. The improvement of claim 1 with additionally means operable upon operation of said latching circuit for periodically interrupting operation of said latching circuit to provide an alarm of intermittent character.

6. The improved alarm of claim 5 with additionally, means operable upon operation of said latching circuit for terminating operation of said latching circuit and said alarm after a fixed period of intermittent operation of said alarm.

* * * * *